United States Patent
Coenen

(10) Patent No.: US 7,464,526 B2
(45) Date of Patent: Dec. 16, 2008

(54) DRIVE ASSEMBLY FOR LOCKING ONE OR SEVERAL OPERATING UNITS OF AN AGRICULTURAL IMPLEMENT OR OF A SELF-PROPELLED IMPLEMENT

(75) Inventor: Karl Coenen, Siegburg (DE)

(73) Assignee: GKN Walterscheid GmbH (DE)

( * ) Notice: Subject to any disclaimer, the term of this patent is extended or adjusted under 35 U.S.C. 154(b) by 36 days.

(21) Appl. No.: 10/243,850

(22) Filed: Sep. 13, 2002

(65) Prior Publication Data

US 2003/0069102 A1   Apr. 10, 2003

(30) Foreign Application Priority Data

Sep. 14, 2001   (DE) ................ 101 45 407

(51) Int. Cl.
*A01D 75/18*   (2006.01)

(52) U.S. Cl. .............. 56/10.3; 192/56.1; 464/45; 56/11.3

(58) Field of Classification Search .......... 56/10.3, 56/11.2, 11.3, 10.2 J, 10.2 R; 192/150, 220, 192/220.1, 54.1, 55.1, 56.1–56.62, 15; 464/30–48
See application file for complete search history.

(56) References Cited

U.S. PATENT DOCUMENTS

| | | | | |
|---|---|---|---|---|
| 3,543,285 A | * | 11/1970 | Frigger | 188/106 F |
| 3,596,740 A | * | 8/1971 | Nau | 188/74 |
| 3,729,074 A | * | 4/1973 | Anderson et al. | 192/220.1 |
| 3,868,003 A | * | 2/1975 | Smith | 192/220.1 |
| 4,055,935 A | * | 11/1977 | Malion et al. | 56/10.3 |
| 4,193,248 A | * | 3/1980 | Gilleman | 460/3 |
| 4,324,324 A | * | 4/1982 | Priepke et al. | 192/101 |
| 4,416,107 A | * | 11/1983 | Hoff | 56/11.3 |
| 5,033,595 A | * | 7/1991 | Pardee | 192/18 R |
| 5,555,962 A | * | 9/1996 | Hinterlechner | 192/12 R |

(Continued)

FOREIGN PATENT DOCUMENTS

DE   25 51 618   12/1982

(Continued)

OTHER PUBLICATIONS

Dubbel, Taschenbuch des Maschinenbaus, pp. Q9-Q12.

*Primary Examiner*—Thomas B Will
*Assistant Examiner*—Alicia Torres
(74) *Attorney, Agent, or Firm*—Harness, Dickey & Pierce, P.L.C.

(57) ABSTRACT

A drive assembly driven by a drive unit locks one or several operating units (6) of an agricultural implement (1) or of a self-propelled implement. The operating unit (6) can be locked when switching off the drive unit or upon reaction of an overload coupling (4). The drive assembly (3) has an overload coupling (4) connected to the drive unit and driven by the drive unit in one driving direction of rotation. The overload coupling (4) is also connected to the operating unit (6). The drive assembly (3) further has a brake unit (5) connected to the overload coupling (4). The brake unit (5) is intended to be arranged in the driveline between the overload coupling (4) and the operating unit (6). Actuating mechanism (10) actuates the brake unit (5) when the operating unit is running so that the operating unit is braked and locked. Thereafter, the overload coupling is disconnected.

4 Claims, 1 Drawing Sheet

U.S. PATENT DOCUMENTS

| | | | |
|---|---|---|---|
| 5,581,985 A * | 12/1996 | Secosky | 56/10.3 |
| 5,616,080 A * | 4/1997 | Miescher | 464/35 |
| 5,921,071 A * | 7/1999 | Paquet et al. | 56/16.6 |
| 5,927,453 A | 7/1999 | Hinterlechner | 192/12 R |
| 5,947,866 A * | 9/1999 | Nagashima | 477/200 |
| 6,173,225 B1 | 1/2001 | Stelzle et al. | 701/50 |
| 6,247,296 B1 * | 6/2001 | Becker et al. | 56/11.2 |
| 6,318,056 B1 * | 11/2001 | Rauch et al. | 56/10.2 J |
| 6,393,813 B1 * | 5/2002 | Nowak | 56/10.2 J |
| 6,691,849 B1 * | 2/2004 | Dyson et al. | 192/55.1 |

FOREIGN PATENT DOCUMENTS

| | | |
|---|---|---|
| DE | 35 30 685 | 3/1987 |
| DE | 41 23 681 | 1/1993 |
| DE | 198 31 506 | 1/2000 |
| DE | 198 47 891 | 4/2000 |
| EP | 0 715 088 | 6/1996 |
| EP | 1 004 234 | 5/2000 |
| GB | 2 013 462 | 8/1979 |
| GB | 2 161 574 | 1/1986 |

* cited by examiner

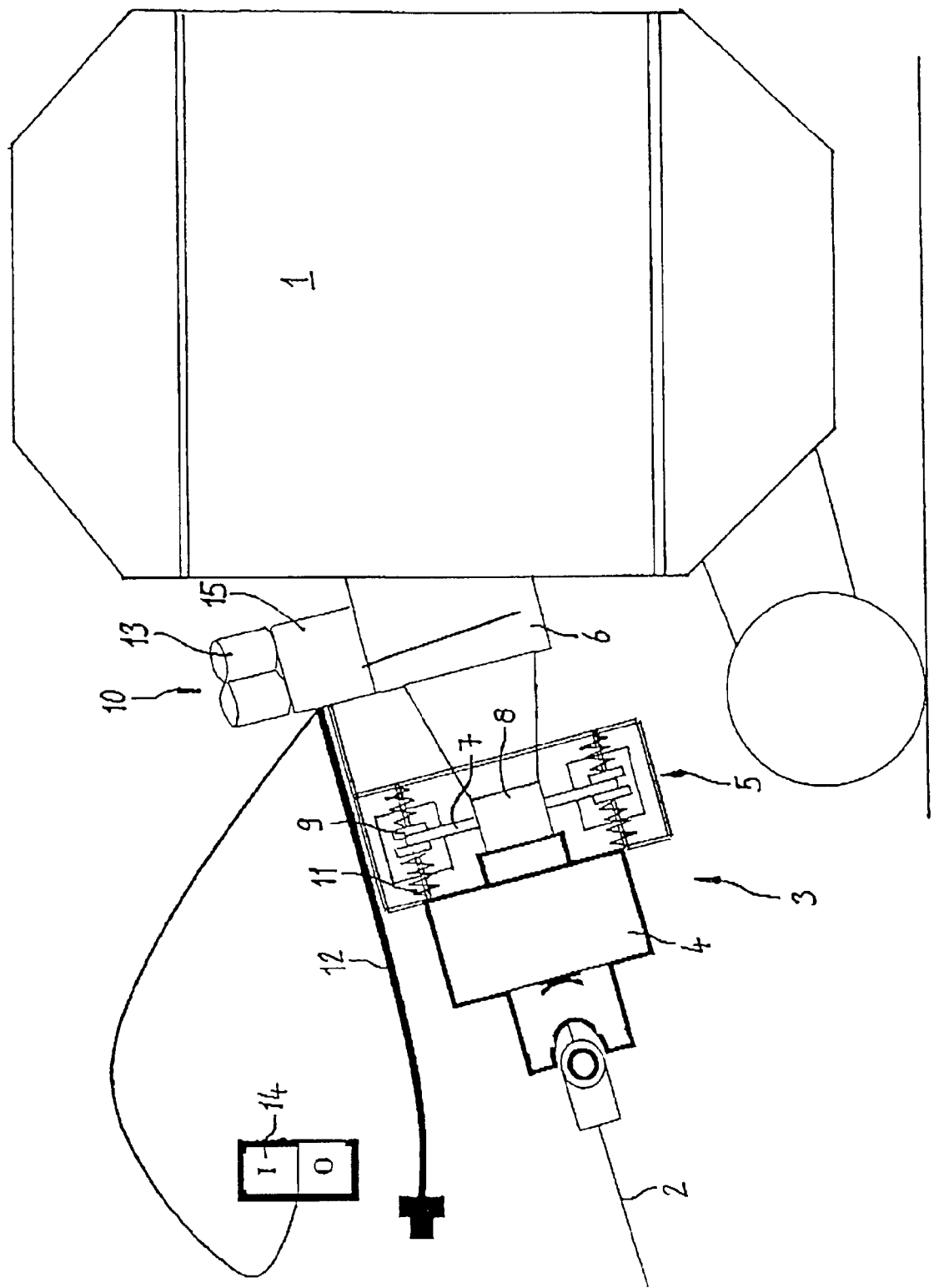

DRIVE ASSEMBLY FOR LOCKING ONE OR SEVERAL OPERATING UNITS OF AN AGRICULTURAL IMPLEMENT OR OF A SELF-PROPELLED IMPLEMENT

CROSS-REFERENCE TO RELATED APPLICATION

This application claims priority to German Patent Application No. 10145407.4, filed Sep. 14, 2001, which application is herein expressly incorporated by reference.

FIELD OF THE INVENTION

The invention relates to a drive assembly for locking one or several operating units of an agricultural implement or of a self-propelled implement in an emergency. Locking is affected by a drive assembly driven by a drive unit in a driveline.

BACKGROUND OF THE INVENTION

Prior art agricultural implements or self-propelled implements such as bailing presses, mowing machines or harvesting machines have operating units which are driven by a drive unit, as a rule by an internal combustion engine. An overload coupling is provided in the driveline between the drive unit and the operating unit. The overload coupling prevents any damage to the operating unit in the case of overloading. Overload couplings are in the form of form-fitting overload couplings such as shear pin couplings, force-locking overload couplings such as locking member couplings and friction-locking overload couplings.

As a rule, the masses of the to be driven operating units in agricultural implements and self-propelled implements are very large. Accordingly, when the overload coupling reacts, the inert masses of the operating unit continue to run for a long time. This may cause damage to the operating unit.

SUMMARY OF THE INVENTION

It is an object of the present invention to provide a method where the drive unit is protected from overloading when the operating unit is locked. Also, the operating unit is stopped as quickly as possible.

In accordance with the invention, a drive assembly driven by a drive unit for locking one or several operating units of an agricultural implement or a self-propelled implement in a driveline, comprises an overload coupling connected to the drive unit and driven by the drive unit in one driving direction of rotation. Also, the overload coupling may be connected to the operating unit. A brake unit is connected to the overload coupling. The brake unit is intended to be arranged in the driveline between the overload coupling and the operating unit. An actuating mechanism actuates the brake unit. If the brake unit is actuated by the actuating mechanism when the operating unit is running, the operating unit is braked and locked and thereafter the overload coupling is disconnected.

In this way, it is possible to brake and lock the large masses of the operating unit which continue to run. Thus, rotating masses no longer constitute a risk. By arranging the brake unit between the overload coupling and the operating unit, the brake unit can be actuated even while the drive unit is running. The overload coupling is disconnected as a result of the braked operating unit. Also, the power flow is interrupted.

The brake unit may be a disc brake with at least one brake disc and brake jaws. The brake unit may also be a drum brake or a multi-plate coupling with a plurality of friction plates.

In a preferred embodiment, the actuating mechanism is actuated manually. The manual actuating mechanism may be an emergency off-switch. Thus, the operating unit can be stopped manually in the case of an emergency.

It is possible for foreign bodies to penetrate into the operating range of the agricultural implement or self-propelled implement or into the operating range of the operating unit, the foreign bodies are detected by sensors of the actuating mechanism. Upon detection, the brake unit is actuated automatically. The actuating mechanism can be manually operated to release the brake unit.

In this way, it is possible for the brake unit to be braked automatically if a foreign body enters into the operating range or when an object enters the operating range of an implement. The object may cause damage to the implement. The manually operable mechanism to release the brake unit can be arranged in the driver's cab. Thus, the brake unit may be released only when the driver is no longer in the operating range.

The sensors can be optical sensors for monitoring the operating range of the implement. Furthermore, it is possible to provide electronic sensors to identify the opening of an implement flap or hood.

The brake unit is loaded by a spring into a braked position. Thus, when the brake unit is released, the actuating mechanism loads the brake unit against the spring force of the spring into an unbraked position. Thus, the brake unit is always loaded by the spring towards a braked position. Only when actively actuating the actuating mechanism is it possible to release the brake unit.

Further, the actuating mechanism includes electric, hydraulic or pneumatic elements to load the brake unit against the spring force of the spring when releasing the brake unit. By introducing this measure, the brake unit can be released only when the agricultural implement or the self-propelled implement is in operation and when electric, hydraulic or pneumatic energy is available. If the energy source fails or after the drive unit has been disconnected, the brake unit is braked automatically by the spring.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

The FIGURE is a schematic view of a drive assembly in accordance with the invention.

DETAILED DESCRIPTION OF THE PREFERRED EMBODIMENTS

The following description of the preferred embodiment(s) is merely exemplary in nature and is in no way intended to limit the invention, its application, or uses.

The FIGURE shows an agricultural implement 1 which is pulled or driven by a tractor. A driveline to drive the agricultural implement 1 includes a driveshaft 2. On one side, the driveshaft 2 is connected to a power take-off shaft of the tractor. On the other side, the driveshaft 2 is connected to a drive assembly 3 of the driveline. The drive assembly 3 includes an overload coupling 4. The overload coupling 4 may be a form-fitting, force-locking or friction-locking overload coupling. The overload coupling 4 is connected to the driveshaft 2 on one side and to a brake unit 5 on the other. The brake unit 5, in turn, with respect to drive, is connected to an operating unit 6 of the agricultural implement 1. Thus, it is possible to transmit driving torque from the power take-off shaft of the tractor, via the driveshaft 2, the overload coupling 4 and the brake unit 5 to the operating unit 6.

The brake unit 5 includes a brake disc 7 connected to a driveshaft 8 in a rotationally fast way. Furthermore, the brake unit 7 includes brake jaws 9 which brake the brake disc 7 and thus the driveshaft 8.

An actuating mechanism 10 actuates the brake unit 5. The actuating mechanism 10 includes a spring 11 which loads the brake jaws 9 towards the brake disc 7 and thus, the brake unit 5 into a braked position. Via a hydraulic line 12, the actuating mechanism 10 is connected to a hydraulic pressure source. The brake jaws 9 can be released from the brake disc 7 by hydraulic cylinders. Thus, the brake unit 4 can be transferred into an unbraked position. The supply of pressure agents to the hydraulic cylinders can be interrupted by an emergency off-switch 13. The spring 11 presses the brake jaws 9 against the brake disc 7 and brakes and stops the driveshaft 8. Therefore, the operating unit 6 is also braked and stopped. An electric switch 14 releases the brake unit 5. The electric switch 14 actuates a hydraulic valve 15, so that the hydraulic cylinder is again pressure-loaded and the brake unit 5 is released.

The agricultural implement 1, for instance, can be a mowing machine, a loader or a bailing press. It could also be a driveline for a self-propelled implement such as a harvester. In addition to the emergency off-switch 13, the actuating mechanism 10 can also include sensors. The sensors monitor the operating range of the operating unit 6 or of the entire agricultural implement 1. The sensors actuate the brake unit if foreign bodies are found in the operating range. The switch 14 to release the brake unit 5 should be located in the driver's cab. Thus, the brake unit 5 cannot be released until the driver has moved away from the agricultural implement 1.

The spring 11 ensures that, when the pressure source is switched off, thus when a drive unit for driving the agricultural implement 1 is switched off, the brake unit 5 is held in the braked position.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A drive assembly driven by a drive unit for locking one or several operating units of an agricultural implement or a self-propelled implement in a driveline, said drive assembly comprising:

an overload coupling connected to a drive unit and driven by said drive unit in one driving direction of rotation, and said overload coupling connected to an operating unit and said overload coupling being self-actuating and disconnecting when a specific torque limit is exceeded;

a brake unit connected to the overload coupling, said brake unit including a friction brake member biased directly by a spring in a braked position, said brake unit adapted to be arranged in the driveline between the overload coupling and the operating unit, such that when said brake unit is in a braked position, said overload coupling is disconnected and torque is not provided to said operating unit;

an actuating mechanism for actuating the brake unit, said actuating mechanism being activated to move said brake unit into a release or unbraked position which enables torque from said overload coupling to pass to said operating unit for running the operating unit, and when the actuating mechanism is deactivated, the brake unit is braked and locked by the spring engaging the friction brake member causing the overload coupling to be disconnected.

2. A drive assembly according to claim 1, wherein the actuating mechanism is actuated manually.

3. A drive assembly according to claim 1, wherein penetration of foreign bodies into the operating range of the agricultural implement or of the self-propelled implement or into the operating range of the operating unit is detected by sensors and when said sensors identify foreign bodies, the brake unit is actuated automatically.

4. The drive assembly according to claim 1, wherein said friction brake member being a disk brake, multiple disk brake or a drum brake assembly.

* * * * *